United States Patent [19]

Thornburg et al.

[11] 4,104,515

[45] Aug. 1, 1978

[54] CONSUMABLE CREDIT CARD

[75] Inventors: David D. Thornburg, Los Altos, Calif.; Roy J. Lahr, Fairfield, Conn.

[73] Assignee: Xerox Corporation, Stamford, Conn.

[21] Appl. No.: 747,150

[22] Filed: Dec. 3, 1976

[51] Int. Cl.² .................... G06K 19/02; G06K 19/06
[52] U.S. Cl. .................................... 235/488; 235/492
[58] Field of Search ............ 235/61.12 N, 61.12 NY, 235/61.12 G, 61.7 B, 61.8 A

[56] References Cited

U.S. PATENT DOCUMENTS

| | | | |
|---|---|---|---|
| 3,542,180 | 11/1970 | Segal | 194/4 F |
| 3,873,813 | 3/1975 | Lahr et al. | 235/61.12 N |
| 3,935,933 | 2/1976 | Tanaka et al. | 194/4 R |
| 3,959,630 | 5/1976 | Hogberg | 235/61.12 N |

*Primary Examiner*—Daryl W. Cook

*Attorney, Agent, or Firm*—Leonard Zalman; James J. Ralabate; Sheldon F. Raizes

[57] ABSTRACT

A consumable credit card is provided which comprises a recording device that is adapted to receive progressively advancing recording up to a limit at which time the card is consumed and thereafter is discarded. The card is adapted to be inserted into a reader which accepts, reads and advances the indication on the credit card or reading to indicate an additional use until the credit card is expended and the reader no longer allows the item or service to be dispensed because the credit card has been expended. This credit card employs tapered resistor technology in order to store a permanent record of expended credit and advance same upon energization of the tapered resistor element residing in the device. Methods of employing this device in billing systems are also disclosed.

8 Claims, 2 Drawing Figures

CONSUMABLE CREDIT CARD

BACKGROUND OF THE INVENTION

This invention is directed generally to a device which records usage and is made to advance by external reading means in order that certain services or objects be purchased or credited and more specifically to a consumable credit card system.

It is known that various and sundry coin-operated apparatuses proliferate commercial channels which for example dispense such as vending machines or provide a service such as in electrophotographic copying machines among other applications. Significant revenues are obtained from these coin-operated machines which must from time to time be removed. While these machines perform a most useful and much needed service to both public and their owners, there are obvious difficulties which arise from machine placement both in protected and less protected areas, for example drug stores and libraries and airports, respectively, etc. One of the major difficulties encountered includes the vulnerability of these machines to damage by vandalism of the coin box, in addition to the diversion and annoyance of clerks and attending personnel in surrounding businesses who are continually asked to supply change and the delay in revenue distribution resulting in infrequent removal of the deposited money.

Although there presumably have been attempts to avoid or in some way eliminate coin-operated machines of this type for example by credit card activation of parking gates and access ways there has not as yet been provided a method and means for allowing the purchase of a service or an item other than on a one time basis so that such cards must be continually reissued with annoying frequency and at exorbitant cost. An example of a prior art credit card system which involves altering heat sensitive substrates by remote energization may be found in U.S. Pat. No. 3,873,813 to Roy J. Lahr, having a common assignee.

It has now been discovered with the advent of tapered resistor technology more specifically defined in U.S. Ser. No. 747,167 entitled Tapered Resistor Device filed concurrently herewith which is hereby respectfully incorporated by reference that such technology may be employed in a novel manner to provide a consumable credit card which will hereinafter be defined.

In the above recited application a device is described comprising a tapered resistance element which develops a non-uniform temperature profile upon electrical energization which is interacted after being energized with selected heat sensitive media to provide a number of very useful effects and devices which may be employed in a great many applications with ease, simplicity and greater economy than heretofore possible including the consumable credit card of the instant invention.

Generally described therein a conventional resistor device is seen to be a resistive film having a uniform thickness which has been formed into a resistor of a specified width and length. This film is then placed on an insulating substrate which is bonded to a heat sink. When an electrical current I is passed through the resistor the production of Joule heat causes a steady state temperature above ambient $\Delta T$ which if thermal fringing effects are neglected may be theoretically defined by the relationship $$\Delta T = \frac{d_s I^2 \rho_s}{K_s W^2} \quad \text{(Eq. 1)}$$

in which $ds$ and $Ks$ are respectively the thickness and thermal conductivity of the substrate and $\rho_s$ is the sheet resistivity of the resistive material measured in ohms/-square. (Note: $\rho_s = \rho/d$ where $\rho$ is the bulk resistivity of the resistive material.) It is readily seen from this illustration that since the width of the resistor is uniform the local power dissipation and hence the temperature rise is also uniform so that no temperature gradient is established and the unique and utilizable effect of the device of the instant invention is not realized.

However, as is seen in FIG. 2 of U.S. Ser. No. 747,167, filed concurrently herewith, a device may be provided including a resistive film which significantly has a varying width in the horizontal plane while the thickness remains uniform. This film may be placed on an insulating substrate 2 which in turn is bonded to a heat sink 3. Now it is seen that the width of the resistive element 1 is a monotonically increasing function of position along the length of the element or in simple terms the resistive element is tapered. In the event the slope of the taper is gradual over distances comparable with the substrate thickness, equation 1 recited above will still be applicable for a first approximation. When a tapered resistor is energized the local power generation will vary along the length of the resistor so that points of prescribed temperature rise can be made to move along the tapered resistor by varying the current flowing through the device.

Although the non-uniformity of the width of the resistive film 1 may vary in any suitable fashion, it is assumed for purposes of this discussion that the taper is linear as is seen in FIG. 1 so that the following relationship is theoretically true: (Eq. 2) $w = w_o + bx \; 0 < x < 1$ in which $w_o$ is the width at the narrow end of the taper, $b$ is the slope of the taper and $x$ is the distance along the resistor measured from the narrow end. Assuming that the tapered resistive element is in contact with for example a thermographic substance which undergoes a color change when heated to the temperature $T'$ or above as the current is increased in the tapered resistor a color line of $x'$ will be drawn. The length of this line may theoretically be derived as follows: the temperature differential $\Delta T$ is defined as $\Delta T = T' - T_{amb}$, where $T_{amb}$ is the ambient temperature. Combining equations 1 and 2 yields the relationship between the applied current and the distance $x'$ over which the tapered resistor will be heated to temperature $T'$ or above, i.e., $$x' = \frac{I(d_s\rho_s/K_s\Delta T)^{\frac{1}{2}} - w_o}{b} \quad \text{(Eq. 3)}$$

It is seen that when $w_o$ is greater than zero no region of the taper will be hotter than $T'$ for currents given by $$I < \frac{w_o}{(d_s\rho_s/K_s\Delta T)^{\frac{1}{2}}} \quad \text{(Eq. 4)}$$

In view of the above it is seen that there is a demonstrated need to provide improved method and means in operating coin-operated machines.

Still another object of this invention is to provide a novel consumable credit card.

Yet still another object of this invention is to provide a credit card which when used in connection with exterior means allows multiple uses of heretofore coin-operated machines without need for insertion nor storage of coins.

Again another object of this invention is to provide a novel credit card system which eliminates frequent exchange of currency and coins.

Yet still another object of this invention is to provide a novel credit card system which reduces concomitant abuse associated with coin-operated machines.

These and other objects of the instant invention are accomplished generally speaking by providing a consumable credit card, i.e., a recording device which may be adapted to receive progressively advancing recording up to a limit at which point the card is consumed and may be disposed of. This card is adapted to be inserted into a reader which accepts, reads and advances the indication on the credit card or reading to indicate an additional use until the credit card is expended or consumed and the reader no longer allows the item or service to be dispensed because the credit has been expended.

The consumable credit card of the instant invention must be machine readable, machine programmable, difficult to forge and must in practical application provide a visual indication of the use made or the credit yet to be extended or used. The consumable credit card of the instant invention in addition must characteristically be insensitive to prolonged exposure to environments common to such credit cards or to conventional credit cards such as wallets or other personal carrying apparatus wherein said cards may be mutilated or otherwise physically altered and the car dashboards where such cards may be exposed to humidity, heat, etc.

More specifically, the consumable credit card of the instant invention comprises an electrically insulating substrate on which is placed at least one tapered resistor element which comprises a resistive film placed on a substrate which is heated from an electrical source impressed through contacts adapted to do same. A heat sink is provided in contact with the substrate to insure that the temperature distribution will achieve steady state. The temperature at any point along the film will then vary as $T - T_{amb} = C\rho_s I^2/w^2$ in which $T_{amb}$ is the ambient temperature, $\rho_s$ is the sheet resistivity of the resistive film, $I$ is the impressed current and $w$ is the width of the film at the point of interest. It is seen that for a linear tapered resistive film at an given current the temperature along the film falls off as $w^{-2}$ and that for this film points of constant temperature move linearly with current.

This resistance element is then coated with a suitable thermographic substance which has the property that at some well defined temperature $T_o$ this substance undergoes a rapid and abrupt irreversible color change. The thermographic layer may then be overcoated with a transparent film to provide abrasion resistance for the credit card.

The card thus provided may be utilized since it operates on the following principle: as current is passed through a tapered resistor element narrower regions of the resistor will be heated more than wider regions. As the current is increased to the point where the hottest region of the tapered resistor heated above $T_o$, the thermographic overcoat will change color over that region of the tapered resistor heated to $T_o$ or above. This will result in the drawing of a line whose length can be increased by increasing the Joule heating of the tapered resistance element.

In operation therefore, this card may be used to for example bill for usage in the following manner. Upon insertion of the credit card into an appropriate card reader, electrical contact is made to both ends of the tapered resistor. The card is then transported under an optical system which detects the presence of a colored line for example black assuming for example a thermographic transition when heated from yellow to black. The card is advanced along the length of the black line until the optical system detects a transition from black to yellow, thus indicating that the card has been moved past the last billed region. The process of detecting a transition from black to yellow thus comprises completion of the first interrogation of the card. The card is then billed for the use of the machine by first moving the card into the yellow region beyond the end of the black line by some well defined fixed amount for example 0.1 inch. The optical system now detects a completely yellow field of view. By applying an appropriate electrical signal to the tapered resistor it will be heated sufficiently to cause the black line to extend under the field of view of the optical system. The card has now had its indicating line advanced or has been billed for one use and an appropriate signal can be sent to the apparatus employed to allow usage thereof. By reason of the closed loop nature of the card billing process the tapered resistors do not have to adhere to a rigid resistance tolerance but must instead be made of sufficient uniform resistivity material to guarantee monotonicity of the device resistance over length in excess of the resolution of the optical system used in the card reader. That is the black line should always be increased in length from its previous termination point so that there are no yellow gaps in the resistor. An exception to this requirement could be made if a stepped tapered resistor is employed in view of the uniformly varying tapered resistor discussed herein above. The stepped taper configuration alluded to above is more specifically described in co-pending application U.S. Ser. No. 747,149, entitled Segmented Tapered Resistance Element filed concurrently herewith which is hereby respectfully incorporated by reference. A credit card employing this device would operate in the same manner as a uniformly tapered resistor excepting that a discrete array of dots would then be formed instead of a continuous line. The stepped increment for this device would be governed by the number of uses desired per resistor and the maximum density will be governed by the physics of the credit card temperature distribution.

In both cases the amount of usage which has occured on each card can be determined visually. Once a card has been extended the electrical pulse will not succeed in increasing the black line within a certain prescribed time limit. At this point the electrical addressing circuitry can be made to look for an adjacent tapered resistor which would be used to build the next set of uses or services.

This system may be used to re-equip all coin-operated machines with a reader which accepts the consumable credit card of the instant invention. This card could be purchased from operators of the local surrounding business environment and could represent in the case of an electrophotographic copier the ability to obtain a certain number of copies for example 25. As the card is used in the copier it is altered in such a way that the user is billed for his copies until the 25th copy is made. At this time the card is expended and therefore useless and a new card would have to be purchased. The most significant of these would be better control of the revenues involved and the safety thereof including a substantial reduction as to damage to the copiers in coin box pilferage.

The consumable credit cards of the instant invention may be provided employing any suitable process. The simplicity of this device allows it to be fabricated by numerous methods which are particularly inexpensive including the implementation of a rotogravure press employing an electrically resistive printing ink among others. The resistor network could thus be made by printing these devices onto a suitable plastic stock. Such technologies are well known and by suitable extension thereof of the printing process to a three or four plate press all layers of the credit card can be printed in one continuous operation.

The general premise of the system of the instant invention having been discussed, the specifics of the instant invention will be more nearly understood to the drawings of which:

Figure 1:
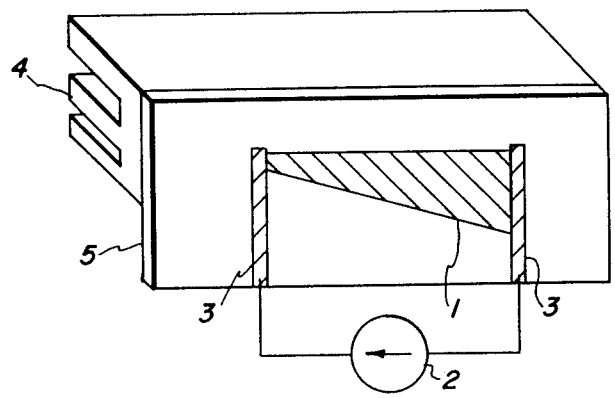
FIG. 1 is a typical example of a tapered resistor device employed in the card of the instant invention.

In FIG. 1 is seen a resistive film 1 on a substrate 5 which is heated as current from a source 2 is impressed through contacts 3. A heat sink 4 is provided to establish a steady state temperature temperature distribution.

Figure 2:
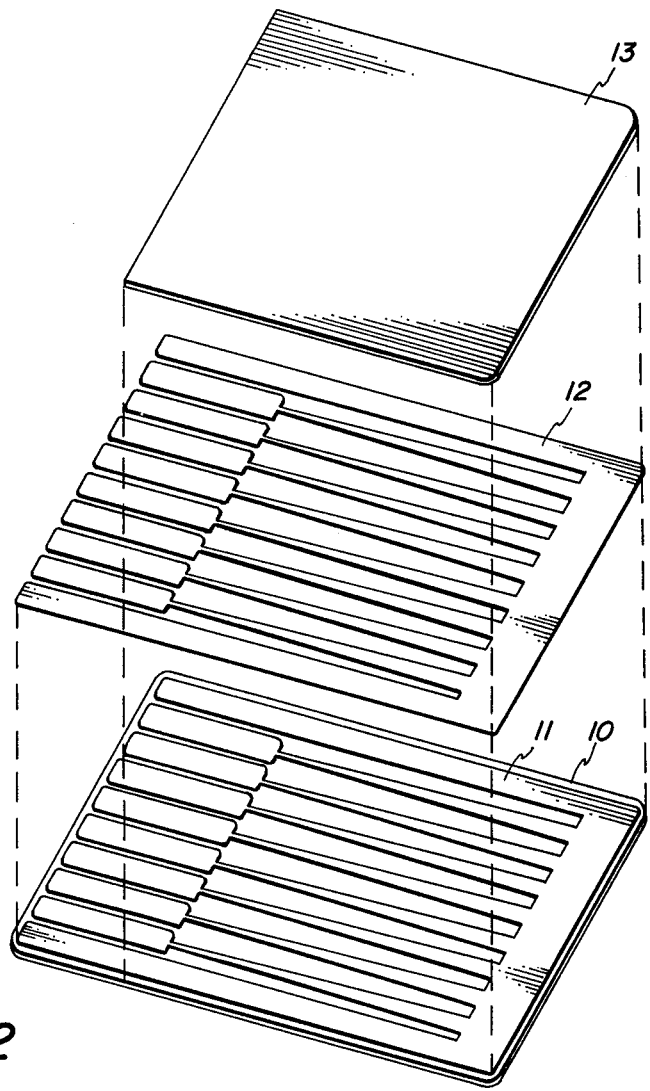
FIG. 2 is a typical consumable card of the instant invention.

In FIG. 2 is seen an exploded view of the consumable credit card of the instant invention comprising a card base 10 which supports a tapered resistance element 11 having located thereover a thermographic medium 12 which is covered with a protective overcoat 13 as hereinbefore described.

To further define the specifics of the present invention, the following examples are intended to illustrate and not limit the particulars of the present system. Parts and percentages are by weight unless otherwise indicated.

EXAMPLE I

A card is parepared using a silver filled printing ink made by Acheson Colloids Co. screen printed onto thin polystyrene plastic stock. The tapered resistors are of two kinds. The first kind is a linear taper of 20 to 60 mils over a length of 2 inches, and the second type is a stepped taper which is like the linear taper but also has wide conductive steps located periodically every 0.1 inch. Each TRE has a resistance of about 4 ohms. Samples of each type of device are covered with a layer of 3M type 383 black imaging film on a clean background. This film is described in U.S. Pat. No. 3,682,684 and abruptly turns from clear to black when heated above a critical temperature. This image film is adhered to the tapered resistors by a pressure sensitive adhesive film. Each device is connected to a 60Hz variable power source for the linear taper device. A sharp black line is drawn on the 3M film with a current in the TRD of 800MA. The line continues to increase in length as long as the current is maintained. The stepped TRD draws a series of discrete black dots when a current of 600MA is raised through the device.

EXAMPLE II

Monel clad (0.001 inch) Mylar ® (0.010 inch) is obtained from the Rogers Corporation (Chandler, Arizona) and is etched into a stepped tapered resistor by conventional photolithographic processing using a $FeCl_3$ based etchant. This device is then coated with a piece of "Teacher's Pet" thermally sensitive overheat transparency film with two sided adhesive tape. The tapered resistor tapers from 0.020 to 0.060 inch over a length of 2 inches and has wide conductive steps located periodically every 0.1 inch. A dotted blue line is drawn in the "teacher's pet" film by increasing the current through the TRE. Full line length is achieved with a total power dissipation of 1 watt in the TRE.

Although the present examples were specific in terms of conditions and materials used, any of the above listed typical materials may be substituted when suitable in the above examples with similar results. In addition to the steps used to carry out the process of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. A consumable credit card comprising an electrically insulating substrate, at least one tapered resistance element comprising a resistive film having contacts at either end placed on said substrate said film being heated from an electrical source impressed through said contacts, each element being in thermal contact with said substrate, a thermographic substance coated over said resistance element which at a certain temperature undergoes a rapid and abrupt irreversible color change.

2. The card as defined in claim 1 wherein said thermographic substance is overcoated with a transparent film to provide abrasive resistance.

3. The device as defined in claim 1 wherein said substrate comprises one material selected from the group consisting of borosilicate glasses, ceramics, epoxy/glass composites, silicone rubbers, polyimides and polyethylene terephthalate.

4. The card as defined in claim 1 wherein said resistive element comprises one material selected from the group consisting of chromium, nickel, nickel chromium alloys, copper nickel alloys, and stainless steel.

5. The card as defined in claim 1 wherein said resistive element comprises acrylic based paints which are silver filled to proper sheet resistivity.

6. The card as defined in claim 5 wherein said sheet resistivity is in a range of from about 0.1 to 1,000 ohms per square.

7. The card as defined in claim 1 wherein said tapered resistive element comprises a stepped taper configuration.

8. The card as defined in claim 1 wherein said resistive element comprises a resistive printing ink.

* * * * *